United States Patent [19]

Bain

[11] 4,354,091

[45] Oct. 12, 1982

[54] PORTABLE AUXILIARY WARMING ROOM APPARATUS

[76] Inventor: Claud N. Bain, 2846 Maple La., Fairfax, Va. 22030

[21] Appl. No.: 148,442

[22] Filed: May 9, 1980

[51] Int. Cl.³ .............................................. H05B 3/66
[52] U.S. Cl. .................................. 219/213; 219/212; 219/217; 219/345; 219/529; 219/545; 219/549; 219/533
[58] Field of Search ............... 219/211, 212, 213, 217, 219/345, 524, 525, 527, 528, 533, 529, 543, 545, 548, 549; 5/348; 165/21

[56] References Cited

U.S. PATENT DOCUMENTS

| | | | |
|---|---|---|---|
| 2,404,736 | 7/1946 | Marick | 219/528 X |
| 2,469,466 | 5/1949 | Herrington | 219/529 X |
| 2,492,258 | 12/1949 | Berg | 219/528 X |
| 2,495,414 | 1/1950 | Herrington | 219/529 X |
| 2,613,306 | 10/1952 | Waltersdorf et al. | 219/345 |
| 2,621,279 | 12/1952 | Richardson | 219/217 X |
| 2,649,533 | 8/1953 | Meredith et al. | 219/217 |
| 2,666,840 | 1/1954 | Poirier | 219/528 |
| 2,698,893 | 1/1955 | Ballard | 219/217 |
| 2,731,542 | 1/1956 | Daniels | 219/217 |
| 2,932,711 | 4/1960 | Adams | 219/213 X |
| 3,017,493 | 1/1962 | Cooke | 219/217 X |
| 3,072,776 | 1/1963 | Quenneville | 219/212 |
| 3,223,825 | 12/1965 | Williams | 219/213 |
| 3,244,856 | 4/1966 | Lueder | 219/213 |
| 3,265,864 | 8/1966 | Levinson | 219/545 |
| 3,374,338 | 3/1968 | Morey | 219/529 |
| 3,410,336 | 12/1968 | Eisler | 219/213 X |
| 3,438,069 | 4/1969 | Long | 219/212 X |
| 3,473,003 | 10/1969 | Eisler | 219/213 |
| 3,539,767 | 11/1970 | Eisler | 219/213 |
| 3,539,768 | 11/1970 | Eisler | 219/213 |
| 3,866,016 | 2/1975 | Tombu | 219/213 |
| 4,055,745 | 10/1977 | Balaguer | 219/406 |

OTHER PUBLICATIONS

Webster's New World Dictionary, Second Edition, D. B. Guralnik, The World Publishing Co., pp. 1235, 213.

Primary Examiner—Volodymyr Y. Mayewsky
Attorney, Agent, or Firm—James C. Wray

[57] ABSTRACT

A warming room whose flexible, electric blanket-like wall or walls, floor and ceiling generate surface heat to provide uniform warmth in the area which they enclose. Portions of the warming room comprise one or more warming walls or barriers to increase the temperature of an indoor area and enhance the comfort of its occupants. Using the invention, people lower thermostat settings in portions of rooms, offices or other buildings which are not occupied while they occupy the warmer area within the warming room or adjacent to a warming barrier or enclosure made of warming barriers.

26 Claims, 16 Drawing Figures

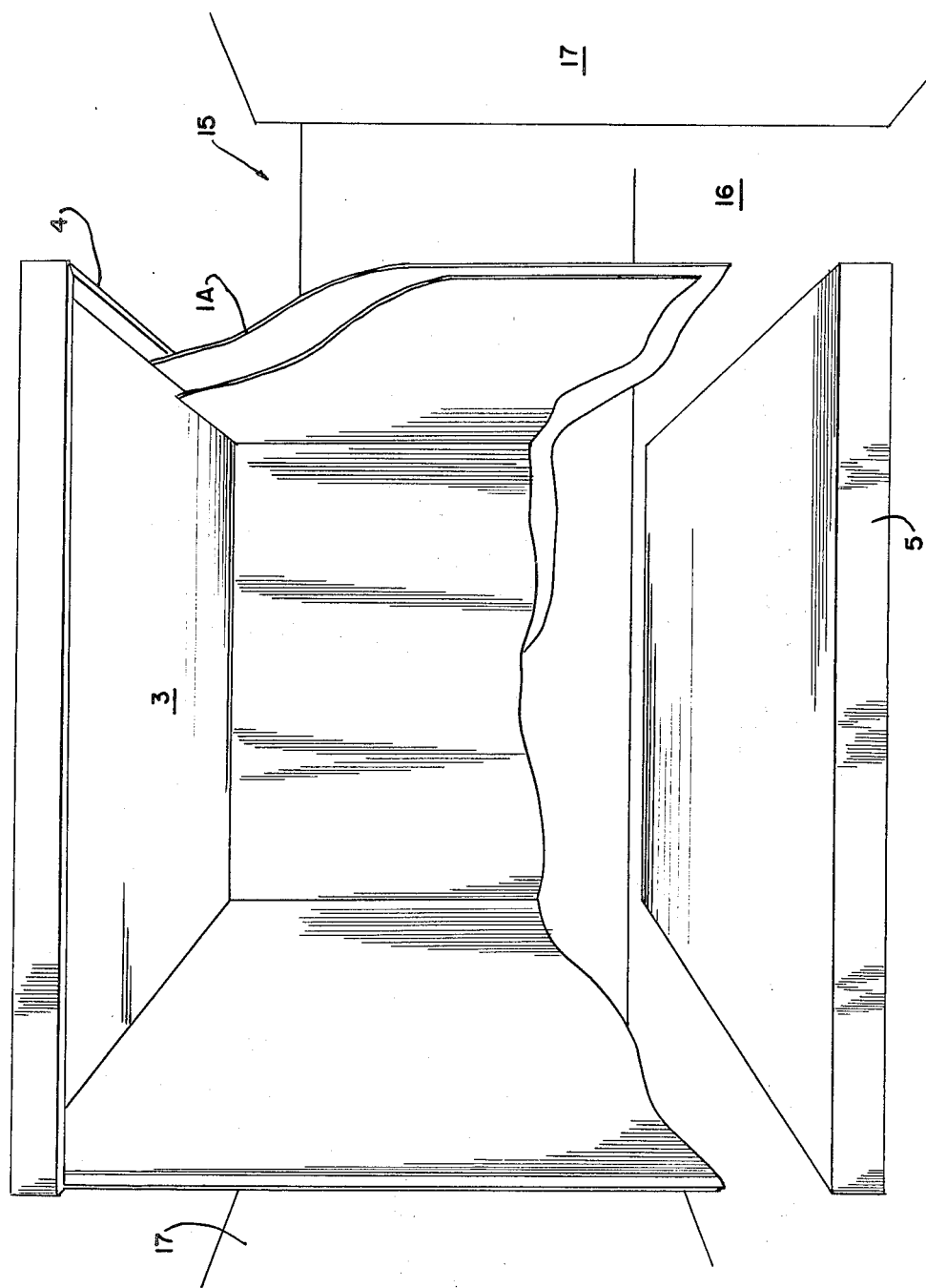

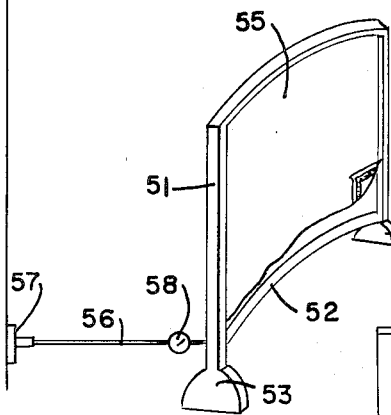
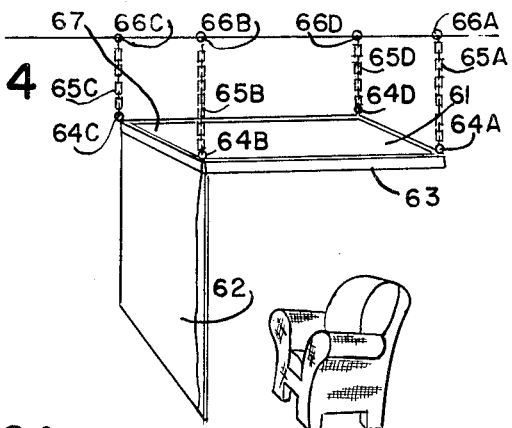
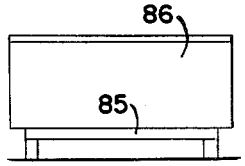
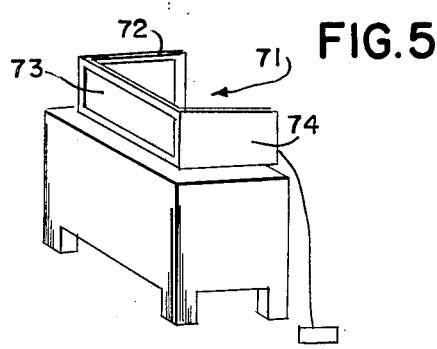
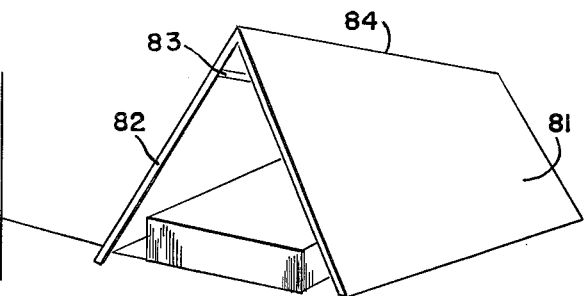
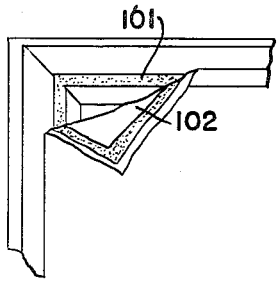
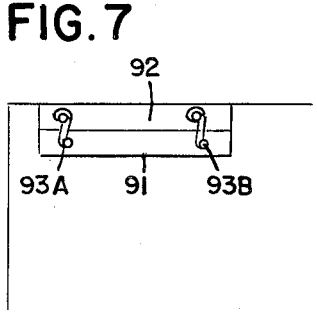
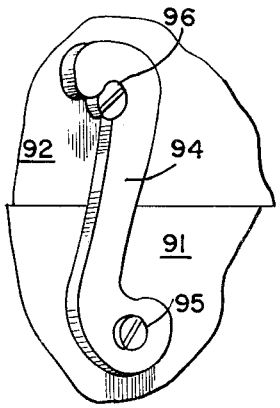
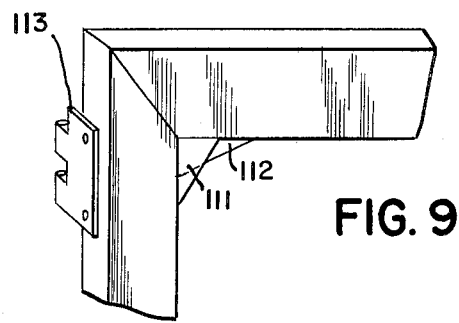

PORTABLE AUXILIARY WARMING ROOM APPARATUS

BACKGROUND OF THE INVENTION

As the cost of conventional, nonrenewable energy sources continues to rise, more and more people are seeking means of reducing their personal energy consumption. Because heating equipment is generally the largest energy drainer in homes, office buildings and other structures, they are trying to economize by turning down their thermostats and learning to live and work in a cooler, indoor environment.

Energy availability and fuel reserves being what they are have caused the administration to encourage citizens to set the thermostats of their homes and businesses to a temperature lower than many consider to be comfortable. High energy costs have also encouraged people to set their thermostats lower. In many cases energy costs have deprived residents of the heat they need. The availability of fuel is expected to become more of a problem over the next several years, and costs are expected to become higher. The lack of energy for heating, whether it is a result of poor service, limited fuel supplies, or fuel costs can be disturbing to a householder. When members of a family are very young or very old, lack of heat can sometimes be tragic.

People who once set their thermostats at 73° F. day and night are trying to adjust to indoor temperatures of 65° or even less. However, such low temperatures may not be high enough to protect the health of the very young, the sick or the aged; and such low temperatures may not provide the comfort necessary for people of any age to perform their work efficiently or to enjoy their leisure pastimes.

While once homes were designed so that only the portions being used could be heated, cheap and abundant fuels during the last 25 years have encouraged the construction of buildings that do not permit this flexibility.

Although it may be desirable to alter modern homes and buildings to permit efficient, selective heating of individual rooms, the cost of required alterations can be prohibitively high. Small, portable space heaters are inefficient, and large rooms rapidly dissipate heat from small space heaters.

SUMMARY OF THE INVENTION

Small, portable, electrically heated rooms can achieve the same goal, i.e., to provide a warm, pleasing indoor environment for their occupants in an economical, energy-saving manner.

Because the warming room provides its own surface heat quickly, efficiently and cheaply, the use of this electrically heated enclosure enables people to turn down their home or office thermostats 10°, 20° to 30° F. or more while they enjoy temperatures of 73° F. or more inside their warming room.

In homes where there are members (young, old, or sick) who cannot tolerate the lower temperatures, small heated enclosures provide the added heat needed and allow temperatures outside this enclosure to remain at 65° F. or lower. A small electrically heated portable room that can be moved into a residence without heat, but with electric service, makes it possible to relieve crisis situations that are fairly common during cold weather. Making well planned, high quality, and reasonably price units available, encourages fuel saving even by the families that can afford high cost fuel, provides families with an emergency heating system that is reasonable in initial cost and is economical to operate, allows low-income families to provide themselves with the required warmth while reducing heating bills, provides welfare and human resources organizations with a portable system to relieve crisis situations, and relaxes to a degree the householder's requirements on source fuel.

The room is planned for use in homes or other buildings, warehouses, factories, offices, laboratories, etc. where small areas need additional heat.

The room ready for use is a rectangular enclosure; the sides, floor, and ceiling of which are made of electric blankets or electric blanket like material. Size and power needed are scaled up or down to fit space, inside-outside temperature differential, and response requirements. The enclosure extends from a wall or is lowered from a ceiling. One typical enclosure is for two adults. An outlet panel provides for telephone service, radio/tv, and power for an electric hot-pot and light cooking. A central thermostat is set to control room temperature. A blower provides air for ventilation. This air can be heated and the heating of incoming air may reduce or eliminate the need for heated walls. In summer, the incoming air may be cooled, airconditioning the portable room and eliminating or reducing requirements for airconditioning of the building.

Requirements are summarized as follows: Floor space and volume are large enough to keep occupants from feeling crowded. Ventilation is adequate to keep air fresh. Heat losses through floor, ceiling, walls are kept low. Heating capacity can be made adequate to bring the interior to a maximum temperature of about 73° F. from 33° F. (minimum temperature outside) in 30 minutes. The thermostat is able to control the temperature $\pm 1°$ F. over a range of 63°–73° F. The unit is equipped with a panel allowing temperature and light control, and providing outlets for telephone and small appliances. Doors, flaps, or overlapping or abutted flexible walls provide easy ingress/egress. The unit is packaged in an integrated container that facilitates its storage or activation through the use of draw strings or other lifting, lowering, or extending mechanisms.

It is an object of the invention to provide an apparatus for isolating a volume inside a residence or other building, and for raising the temperature of this isolated volume (enclosure) a few degrees ($\Delta T$) above the temperature inside the residence (or building).

It is another object of the invention to provide an apparatus that makes use of all sources of heat inside the enclosure (lights, appliances, radio, TV, and body) to maintain the desired $\Delta T$ so as to conserve input energy.

It is a further object of the invention to provide an apparatus that is easily and quickly deployed or stored in a wall or ceiling in its integrated container.

It is still another object of the invention to provide an enclosure with a heating system that heats through large solid angles up to a maximum of $4\pi$ steradians.

It is still another object of the invention to provide an apparatus that encourages fuel saving, provides heating in times of emergency when fuel is not available, and relaxes source fuel requirements.

Another object of the invention is to provide a portable flexible room in which temperature can be inexpensively controlled with appropriate precision.

BRIEF DESCRIPTION OF THE DRAWINGS

FIG. 1A is a detailed preferred construction of the room.

FIG. 3 is a schematic view of a flexible wall.

FIG. 4 is a schematic view of another flexible wall.

FIG. 5 is a schematic view of a heat source.

FIG. 6 is a schematic view of a heat source around a bed.

FIG. 6A is a schematic of a heat source around a bed.

FIGS. 7-9 are details of room construction.

DETAILED DESCRIPTION

Figure 1:
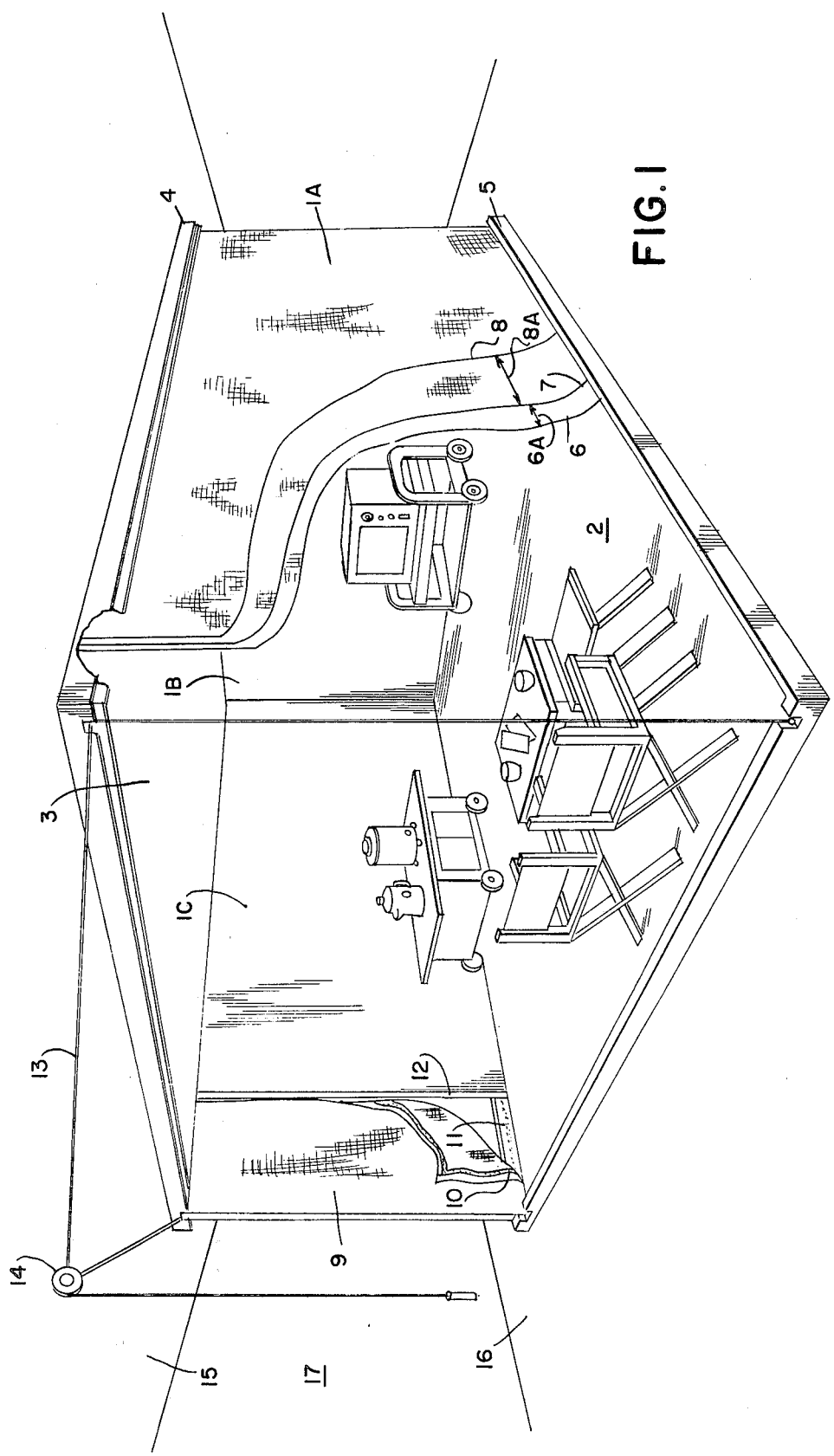
FIG. 1 is a cut-away perspective view of a preferred enclosure.

FIG. 1 shows one embodiment of a warming room designed for use as a home living area for two people. It consists of four flexible walls, three of which are shown, 1A, 1B and 1C; a flexible floor 2; and a flexible ceiling 3.

The floor 2 and ceiling 3 are stretched on wooden frames 4 and 5, and the walls hang from frame 4 to the inner side of frame 5.

Each of the walls consists of three layers: an inner layer 6, made of an electric blanket or electric-blanket-like material; a center layer 7, made of a thin, reflective, layer of foil, plastic or other material and an outer layer 8, made of a quilt blanket or other blanket-like material in plural layers. Air spaces 6A and 8A separate the blanket layers from the center layer.

The floor and ceiling of the warming room are made of the same three layers of material. Floor 2 has no heating wires in those areas which form a pattern corresponding to the pattern of anticipated wear.

On wall 1C, a flap or door 9 is shown, peeled away from the floor frame 5 and side of the wall. The outer side of flap or door 9 is banded on four sides by strips of Velcro fastening tape 10. The adjacent edge of flexible wall 1C is also banded with Velcro fastening tape 12, as is the inner side of floor frame 5, as shown at 11. In fact, each wall blanket is attached to neighboring wall blankets by Velcro fastening tape, as well as to the ceiling and floor frames, which are also banded with Velcro tape. The Velcro fastening tape may be augmented or replaced by suitable fastening means, e.g., snaps, hooks, twist fasteners, and others. After removal of furniture, the long draw string 13, which winds around pulley 14, can be tugged to raise the floor platform 5 and walls of the warming room for unobtrusive and convenient overhead storage.

FIG. 1A shows the warming room of FIG. 1 positioned in a larger, less heated room 15, with platform 5 resting on floor 16 and walls such as 1A spaced by walls 17 of the large room 15.

Figure 2:
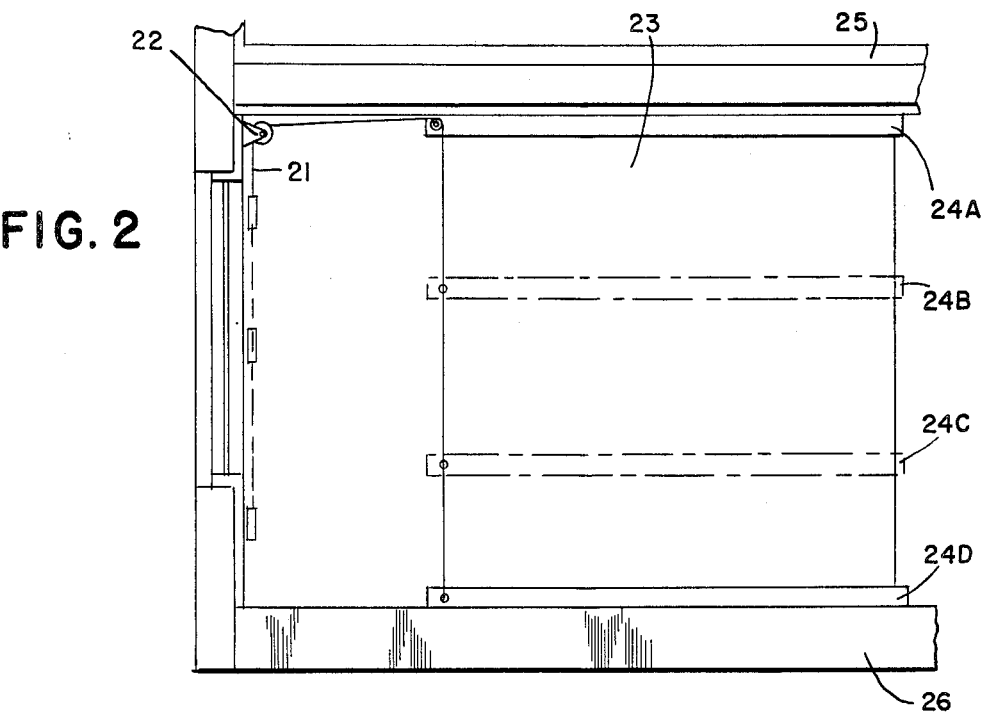
FIG. 2 is a schematic detail of room deployment.

FIG. 2 shows a side view of one flexible wall of a warming room whose sides can be raised by a pulley mechanism for overhead storage. By tugging on drawstring 21, which winds around pulley 22, flexible wall 23 can easily be raised for storage or lowered for use. Slats 24A, 24B, 24C and 24D provide additional support for the wall and facilitate the raising or lowering operation.

A stationary frame 25 is attached to the ceiling of the room in which the warming room is placed. A floor platform 26, rests on the floor of the outer room. FIG. 2A is a detail of a construction as shown in FIG. 1. Platform 5 is raised by rope 13 attached to padeye 28. Flexible wall 1A folds inward as platform 5 is raised.

Figure 2B:
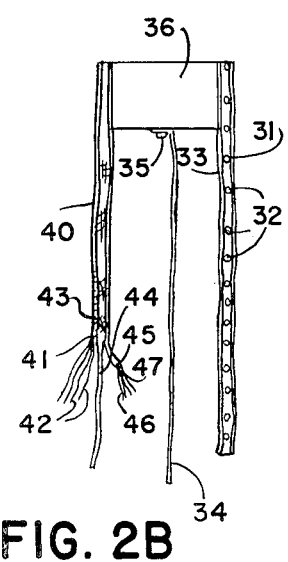
FIG. 2B is a detail of a preferred wall.
Figure 2A:
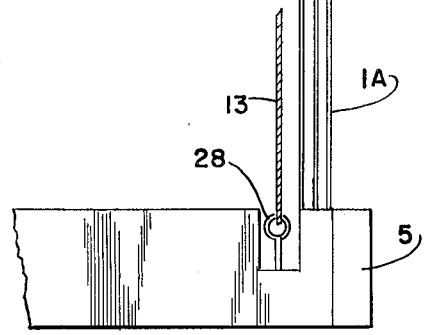
FIG. 2A is a detail of the room.

FIG. 2B shows a preferred wall construction. An electric blanket has an inner layer 31 and an outer layer 33 with heating wires 32 therebetween. Reflective layer 34, which may be a polyethylene sheet, is attached to head frame 36 by fasteners 35, which may be common nails. An outer quilt like layer 40 includes and outer layer 41 with inner laminates 42 stitched together and to the outer layer 41 with quilting stitches 43. An interior blanket layer 44 separates the two oppositely facing quilts. Inner quilt 45 has a surface layer stitched to laminates 46 by stitches 47 arranged in a quilt-like pattern. The internal electric blanket, the moisture barrier reflective layer 34 and the outer quilt 40 held in spaced relationship account for the low heat loss which is experienced.

FIG. 3 shows one embodiment of a single warming barrier which is mounted on a four-sided, curved frame 51, whose vertical sides extend beyond lower side 52 and expand into stabilizing, curved platforms 53 and 54. Blanket layers 55 are securely attached to the frame by Velcro fastening tape, not shown. An electric cord 56 extends from the inner surface of the electric blanket layer to a wall outlet 57. Although warming barrier control dial 58 is shown on the cord 56 near one of the lower corners of the warming barrier, it may be placed anywhere on or near the frame that is convenient.

FIG. 4 shows an embodiment of a ceiling-suspended warming barrier 61 to which a hanging barrier 62 has been attached to one side.

The blanket layers of warming barrier 61 are mounted on a frame 63, to which hooks 64A, 64B and 64C and 64D have been attached. Warming barrier 61 hangs horizontally from the ceiling of the room in which it is placed from chains 65A, 65B, 65C and 65D, which are attached to hooks 64A and 66A, 64B and 66B, 64C and 66C and 64D and 66D respectively. Hanging barrier 62 is attached to one side of warming barrier 1 by means of metal grippers, not shown. No other supports are required in this embodiment.

FIG. 5 shows a portable, desk-top warming enclosure 71, comprising three small, framed warming barriers 72, 73 and 74. Frame 72 is hinged to frame 73 on one side, and frame 74 is hinged to frame 73 on one side, making a U-shaped enclosure.

FIG. 6 shows a tent-shaped warming enclosure comprising two framed, warming barriers 81 and 82 joined on one edge by a hinge 84. In each of the two side openings formed when the joined barriers are placed hinge sides up, a metal brace 83 is attached. Like those on a folding card table, the brace folds up to facilitate storage of the enclosure.

However, unlike the braces on a card table, brace 83 and its counterpart on the opposite end of the tent are adjustable, i.e., can be shortened or lengthened to raise or lower the height of the tent and thereby create more or less enclosed floor space. The amount of floor space desired is determined by the size of the bed, cot or sleeping bag to be accomodated. FIG. 6A shows a heated canopy 86 over an ordinary four poster bed 85.

The inside is equipped with light for reading, study, TV viewing or other activity.

FIG. 7 shows a side view of a warming room which is attached to and stored against the ceiling of an outer room in the box-like container formed when floor frame 91 is attached to ceiling frame 92 by means of S-shaped, metal fasteners 93A and 93B and their counterparts on other sides of the container not shows. In FIG. 7A, an isolated view of the fastener, the S-shaped element 94 pivots around a screw 95 which is attached to the side of floor frame 91. The upper curve of element 94 bites over screw 96, which is attached to ceiling frame 92, when the warming room is being stored. Not shown in FIG. 7 are the blanket layers which have been removed from frames 91 and 92 and placed inward in the cavity which is formed by floor and ceiling frames.

FIG. 8 shows the corner of a warming barrier with its outer blanket layer turned back to reveal Velcro tape banding 101 the outer side of the frame and the inner edge of blanket 102.

FIG. 9 shows a corner of a warming barrier frame, whose interlocking sides pull apart easily for storage. Wedge-shaped, wooden braces 111 and 112 fit into notches on the inner side of the frame to lock the corner into place. Also shown in FIG. 9 is one half of a hinge 113, screwed to the side of the frame. When joined to a complementarily hinged wall, a free-standing warming enclosure results.

Figures 10, 11:
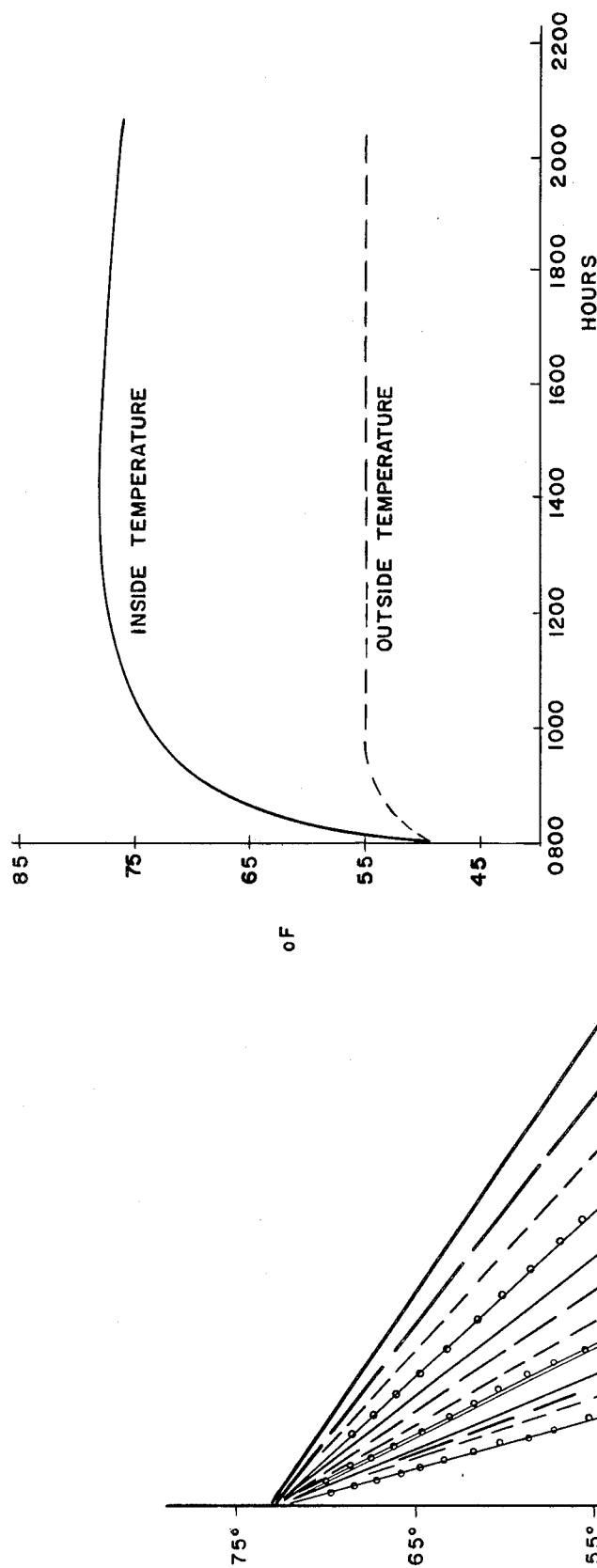
FIG. 10 is a chart of heat inputs required for temperature differentials between inside the room and outside the flexible walls of the room.
FIG. 11 is a graph showing differential temperature when low power is provided to the room until a maximum cut-off point.

FIG. 10 is a graph showing the heat input (in watts) required to raise the temperature of a warming room to 73° F., given the dimensions of the warming room, the temperature outside the warming room and the conductivity of the warming room's wall structure, expressed as equivalents to layers of wool 2 inches thick, one inch thick and 0.5 inch thick.

FIG. 11 is a graph comparing temperature and time in one day's operation of an existing warming room. The dashed curve gives the ambient temperature in a substantially draft free room of a building heated to about 55° F. Tests have shown that about 20 watts per degree temperature differential are required to raise the temperature of a room about 10'×10' by 7'. The room power was switched on at 0800 hours. At approximately 1400 hours, the thermostats were set to maintain the temperature at approximately 75° F. The power was turned off at 2000 hours, ending this particular test.

The invention is particularly concerned with providing an energy-saving system for creating a warm pleasing indoor environment within a selected room of a home, office or other building.

To achieve this aim, the warming room makes use of one or more flexible walls composed of electric-blankets or electric-blanket-like materials which generate their own surface heat to warm the room's interior.

The size of the warming room, the materials of which it is made, the means by which it is constructed and the techniques by which it is installed may vary. However, all warming rooms have in common one or more walls made of electric blankets or electric-blanket-like materials. Some embodiments may consist of rigid screen like surfaces that are joined and fold. A floor is made of an electric blanket or electric-blanket-like material, the floor blanket will generally have a light weight rug over it, and a ceiling made of an electric blanket or electric-blanket-like material.

In one sample embodiment, shown in FIG. 1, the warming room consists of four walls, a ceiling and a floor, each of which is composed of an inner layer made of an electric blanket or electric-blanket-like material, an outer layer made of a blanket or blanket-like material, and a center layer, sandwiched between the two blanket layers in an air space, made of a thin, highly reflective aluminized foil. In other embodiments, the center layer may be omitted or replaced by a sheet of plastic or any other suitable material which reflects the long wave length radiation emitted by the blankets, and which can serve as a moisture barrier.

In the sample embodiment, the warming room walls hang from the sides of a frame attached horizontally to the ceiling of the outer room in which it is placed. Because the walls are attached by Velcro tape to the ceiling frame, to a floor frame and to each other, forming a box, they can easily be taken down for cleaning or storage.

In other embodiments, the walls are attached by metal grippers or other suitable fasteners which facilitate their storage and removal for cleaning.

In the sample embodiment, the warming room is equipped with a flap-like door made of the same materials as its walls, which is also banded by Velcro tape. Other embodiments have solid doors or flexible doors which overlap and fasten to adjacent wall edges with metal grippers or other suitable fasteners.

Although the walls and floor of the sample embodiment can be raised by pulleys and stored unobtrusively overhead in a box-like compartment formed when the ceiling and floor frames are joined, another embodiment can be attached to and stored on a conventional wall in a self-container made of two warming room side-wall frames. Other embodiments can be constructed for permanent on-site use or folded or dismantled for conventional storage. They can also be free-standing or dependent on the support of one or more outer walls, which may include a floor or ceiling.

Although the upper surface of the floor of the sample embodiment is made of a solid electric blanket, the floor of another embodiment contains cutouts which form a pattern similar or identical to the pattern of anticipated wear in the warming room. In another variation, the upper surface of the floor contains non-wired areas which form a pattern similar or identical to the pattern of anticipated wear in the warming room.

While the sample embodiment's walls hang from the ceiling frame, the walls of other embodiments are mounted in frames which join the ceilings and floors, as well as the frames of adjacent walls, forming a box. These frames are made of wood, metal, fiberglas or any other suitable building material; in some embodiments, they have additional horizontal or vertical slats to strengthen them and provide a solid surface to which hooks or other items for hanging can be attached. The flexible walls which they support can be attached with Velcro strips, metal grippers or other suitable fasteners which make their removal for cleaning and storage easy.

In another embodiment, the warming room comprises a circular ceiling, a circular floor and a circular wall (with a sliding and folding drape-like or drawn curtain like deployment and storage) which hangs from the ceiling and surrounds the volume (room) to be warmed.

Although the embodiments described above have walls which meet their floor and ceiling, in other embodiments, their wall or walls can be hung from their ceiling frame by wires, ropes, chains or other suitable materials, leaving a gap between the frame and upper wall edge for ventilation.

They may also have such features as panels providing electric current and telephone service, ventilators, blowers for circulating warmed air and narrow-beam heat infrared/high frequency microwave lamps for the quick and localized application of heat in emergency installations.

The volumes of warming rooms can range from small to large, depending on application; materials, structure, and installation techniques can vary significantly from the very small to the large units. The following paragraphs discuss the characteristics and heat input required for initial heating, the heating of ventilating air, and the replacement of heat lost by conduction through enclosure wall, floor and ceiling surfaces.

SAMPLE CALCULATION OF AN EXAMPLE EMBODIMENT

From FIG. 1, the warming room is enclosed by six sides, each formed by two wool blankets. The inside blanket is an electric blanket. A thin, reflective, aluminized foil or plastic sheet may be used behind the electric blanket in the air-space between the two blankets. For purposes of the following calculations, it is assumed that the conductivity of this "wall structure" is equal to that of a layer of wool 0.5 inch thick, and that the temperature of the enclosure is set at 73° F., a 10° F. $\Delta$ above the thermostat setting of the home or building where the warming room is installed.

Initial Heating: The initial heating of the unit will require heating the walls and the enclosed air. If no occupants are present during this preheat period, no ventilation air is needed, and total heat required can be calculated by the following equation:

$$S_T = S_W + S_A + Q_C$$

Where $S_W$ = heat required to raise the mass of the walls through a temperature of $\frac{1}{2}$ $\Delta$T or 5° F.

$S_A$ = heat required to raise the temperature of the enclosed air through $\Delta$T = 10° F.

$Q_C$ = heat lost through the walls of the enclosure during the preheat period.

A rectangular enclosure having width, length, and height dimensions of 6, 8 and 7 feet respectively will have a total wall, ceiling, and floor area of 292 ft.$^2$ and a volume of 336 ft.$^3$. If the weight of the walls (ceiling and floor included) is 60 lbs. and the specific heat of the material in the wall is 0.25, then:

$S_W$ = (60 lbs.) (0.25 BTU/lb. °F.) (5° F.).

$S_W$ = 75 BTUs.

For a relative humidity of 75%, it takes 14.1 ft.$^3$ of air at sea level pressure to weigh 1.0 pound. Under these conditions, the 336 ft.$^3$ of air contained by the warming room will weigh approximately 23.3 lbs. The heat ($S_A$) required to raise the temperature 10° F. is:

$S_A$ = (23.2 lbs.) (0.245 BTUs/lb.) (10° F.)

$S_A$ = 51.7 BTUs.

The heat loss ($Q_C$) from an enclosure is given by:

$$Q_C = A K \Delta T / \Delta t$$

where
A = surface area = 292 ft.$^2$
K = conductivity of walls = 0.25 BTU/(ft. in °F. hr.)

$\Delta$T = inside to outside temperature differential = 10° F. average $\Delta$T during preheat, however, is 5° F.).
$\Delta$t = insulation thickness = 0.5 inch.

$$Q_C = \frac{(292 \text{ ft.}^2)(0.25 \text{ BTU/ft. in °F. hr.})(5° \text{ F.})}{0.5 \text{ in.}}$$

= 730 BTUs/hr. (An average during preheat.)

(When preheat is complete and $\Delta$T is stable at 10° F., $Q_C$ is stable at twice the above value = 1460 BTU/hr.)

Solving equation (1) for $S_T$ assuming a 5 minute preheat time:

$$S_T = 75 \text{ BTUs} + 51.7 \text{ BTUs} + (730 \text{ BTUs/hr.}) \frac{(5 \text{ min.})}{60 \text{ min./hr.}}$$

$S_T$ = 187.5 BTUs = 198,000 Joules.

An electric heating system delivering 660 watts of power can provide this heat in 5 minutes. An enclosure constructed of four 135 watt and two 180 watt commercially available electric blankets will provide 900 watts of power. Once preheat has been accomplished, heat loss $Q_C$ = 1460 BTU/hr. is the only load (as long as the enclosure has no occupants) and can be supplied with 427 watts.

When the warming room is occupied, ventilation air is required. This is defined as 15 ft.$^3$/min. per person. For two persons, this is 30 ft.$^3$/min. or 1800 ft.$^3$/hr.,—a change of air every 11.2 minutes.

The heat ($S_V$) required to raise the temperature of the air through 10° F. is:

$$S_V = \frac{1800 \text{ ft.}^3/\text{hr.}}{14.1 \text{ ft.}^3/\text{lb.}} (0.245 \text{ BTU/lb. °F.}) (10° \text{ F.})$$

= 313.2 BTUs/hr. = 330,000 Joules/hr.

= 91.7 watts (continuous load).

Neglecting the internal heat sources of the occupied enclosure, the operating electrical load $P_i$ is: $P_i = S_V + Q_C = 91.7 + 427 = 518.7$ watts (continuous load), which is well within the capability of the blankets used for the enclosure. In fact, the system could handle a $\Delta$T of slightly more than 17° F.; preheat time would require slightly more than 7 minutes. FIG. 10 shows plots of the heat in watts required to maintain a temperature of 73 inside each of four enclosures against outside temperature for different thickness of insulation. Enclosure sizes are (8×6×7) ft.$^3$, (8×8×7) ft.$^3$, (10×9×7) ft.$^3$, and (10×10×7) ft.$^3$.

Other factors:

Heat gains from the occupants in the warming room from appliances, lamps and heaters incorporated in the ventilating fan will add to the room's performance capability. (For emergency installations where a large $\Delta$T capability is required, provisions for narrow beam heat lamps would make possible the application of localized radiant heat.) Table I shows a list of heat gains that can be expected from occupants and appliances.

TABLE I

| Heat gains (adults, appliances). | | |
|---|---|---|
| | BTUs/hr. | Watts |
| Adult people | 330 | 96.6 |
| Radio | 102 | 30.0 |
| Television | 510 | 150 |
| Electric Hot-pot | 850 | 250 |

TABLE I-continued

| Heat gains (adults, appliances). | | |
|---|---|---|
| | BTUs/hr. | Watts |
| Lamp (example) | 340 | 100 |

Two adults occupying the warming room and using a TV, hot pot, and a 100 watt lamp will increase the ΔT capability of the enclosure by a factor of 1.67 or from 17° F. to 28° F.

A warming room installed in a large building allowing building temperature to be reduced by 10 to 15 degrees would result in significant fuel savings for that building. In older buildings where insulation is poor, a warming room will make fuel savings possible and in many cases prolong the building's habitability.

In addition, some occupants may find the draft-free warmth and womb-like comfort of warming rooms soothing and relaxing. For them, refuge in a warming room may provide unique psychological and recreational benefits.

Although a warming room surrounding its occupants with heat generated by its walls, floor and ceiling illustrates the most energy-efficient use of the invention, space limitations, cost considerations, convenience and other factors also make practical the use of separate warming room walls which can be used alone or in combinations of two or more to fill specialized needs.

A three sided, free-standing warming enclosure made of small electric-blanket-like panels can be placed on a desk top to provide its user with a screen which produces pleasant warmth, while blocking drafts and distractions. A similar 3 sided panel could be placed in the "knee hole" of the desk. A larger, three-sided free-standing warming enclosure can be placed in front of a deck that is at the user's back to enhance comfort, as well as his sense of privacy.

When thermostat settings are reduced in homes, offices and other buildings by only a few degrees Fahrenheit, the comfort of their occupants can be increased by other combinations of warming barriers as well.

Canopies consisting of one or more warming barriers can be hung over a living or working area; one or more barriers can be hung from the sides of such canopies to form partial enclosures; floors made of warming barriers can be used alone or combined with free-standing or ceiling-hung barriers to form partial enclosures; and tent-shaped combinations of warming barriers can be used as sleeping enclosures.

In large offices or suites where the degree of worker's physical activity varies from area to area or room to room, the comfort of sedentary occupants can be enhanced quickly, economically and conveniently by the installation of warming barriers adjacent to, surrounding or partially surrounding the areas in which they work. At the same time, thermostat settings in such offices can be lowered to temperatures active workers in other areas and rooms will find more comfortable.

Although warming barriers and enclosures can be of any size, those which are most versatile range from about 2×3 feet per barrier to about 8×12 feet per barrier.

Adding to their versatility, barriers can be mounted on interlocking frames to make their assembly and storage easy and can be prehinged for attachment to other barriers.

The warming room/enclosure/screen appliances disclosed in this invention can be used in homes, commercial structures and factories to save significant amounts of energy currently used for space heating. These appliances designed to use a minimum of energy, to take advantage of the shelter and insulation of current buildings and to provide heat for only selected areas can be plugged into any 60 cycle, 120 volt AC outlet capable of powering an electrical iron.

While the invention is described with reference to specific embodiments and components of embodiments, it will be obvious to those skilled in the art that modification may be made without departing from the invention, which is specifically pointed out in the following claims.

What is claimed is:

1. Portable auxiliary warming room apparatus comprising a frame for attachment to a fixed ceiling of a fixed room in a building, the frame being widely spaced from at least some of the fixed walls of the fixed room, electric blanket-like material flexible heating walls connected to the frame and hanging downward from the frame to a fixed floor of the fixed room, flexible heating means within the flexible walls, the flexible walls thus confining an auxiliary warming room spaced within the fixed room, the flexible walls further defining an engress and egress opening for permitting passage of a person between the fixed room and the auxiliary room, and an electric blanket-like flexible material flap connected to the frame above the opening and hanging downward for closing the opening, whereby a portable warming room with flexible heating walls is constructed within a fixed room of a building.

2. The warming room apparatus of claim 1 which has a ceiling of an electric blanket-like material.

3. The warming room apparatus of claim 1 which has a floor made of an electric blanket-like material.

4. The warming room apparatus of claim 1 which has a ceiling and a floor, both of which are made of electric blanket-like material.

5. The warming room apparatus of claim 4 whose floor contains cutout areas whose pattern corresponds to the pattern of anticipated wear.

6. The warming room apparatus of claim 4 whose floor contains no heating wires in those areas which form a pattern corresponding to the pattern of anticipated wear.

7. The warming room apparatus of claim 4 whose walls, floor and ceiling are mounted on frames which join to form a box.

8. The warming room apparatus of claim 7 whose frames are made of strong building material.

9. The warming room apparatus of claim 7 whose walls are attached to frames by means of Velcro fasteners which make it easy to remove them for cleaning.

10. The warming room apparatus of claim 4 whose walls are attached to both an upper ceiling frame and a lower floor frame.

11. The warming room apparatus of claim 4, each of whose walls, floor and ceiling, consists of an outer layer made of a blanket-like material and an inner layer made of an electric blanket-like material, separated by an air space.

12. The warming room apparatus of claim 11, each of whose walls, floor and ceiling, contains a layer of thin, highly reflective, aluminized foil, sandwiched between the blanket layers, within the air space.

13. The warming room apparatus of claim 11, each of whose walls, floor and ceiling, contains a layer of plastic which can serve as a moisture barrier, sandwiched between the blanket layers, within the air space.

14. The warming room apparatus of claim 4 whose dimensions are from about 5×5×5 feet to 12×12×8 feet.

15. The warming room apparatus of claim 4 which is equipped with an outlet panel to supply electric current to operate lights, office equipment and small home appliances.

16. The warming room apparatus of claim 4 which is equipped with an outlet panel to provide telephone service.

17. The warming room apparatus of claim 16 which is equipped with an outlet panel to supply electric current.

18. The warming room apparatus of claim 1 whose walls are attached to the frame by means of Velcro fasteners which make it easy to remove them for cleaning.

19. The warming room apparatus of claim 1 having a reflective moisture barrier intermediately spaced outward from the electric blanket-like and a multilayer quilt spaced outward from the intermediate layer.

20. The warming room apparatus of claim 1 whose flap is insulated by: an outer layer made of a blanket-like material, a layer of plastic which serves as a moisture barrier, sandwiched between the electric blanket-like material and the blanket-like material, and a layer of thin, reflective foil sandwiched between two blanket layers.

21. The warming room apparatus of claim 1 comprising at least one wall deployed as a folding drape.

22. The warming room apparatus of claim 1 whose walls are hung from its ceiling frame by suitable materials, leaving an air space for ventilation.

23. The portable auxiliary warming room apparatus of claim 1 wherein the electric blanket-like material flexible heating walls comprise heat reflective layer means and moisture barrier layer means intermediate spaced inner and outer blanket-like layer means and wherein the flexible heating means comprises flexible wires secured in the flexible heating wall between the heat reflective layer means and the inner blanket-like layer means.

24. The portable auxiliary warming room apparatus of claim 1 further comprising a floor frame mounted on the fixed floor, and means to connect lower edges of the flexible heating walls to the floor frame.

25. The portable auxiliary warming room apparatus of claim 24 further comprising plural pulleys connected to the frame which is connected to the fixed ceiling and plural ropes passed over the pulleys and connected to the floor frame, whereby the floor frame may be raised by pulling on the ropes while folding the flexible walls inward to temporarily store the apparatus adjacent the fixed ceiling.

26. Portable auxiliary warming room apparatus comprising a frame for mounting in a fixed room in a building, the frame being widely spaced from at least some of the fixed walls of the fixed room, an electric blanket-like material flexible heating walls connected to the frame and hanging downward from the frame toward a fixed floor of the fixed room, flexible heating means within the flexible walls, the flexible walls thus confining an auxiliary warming room spaced within the fixed room, the flexible walls further defining an engress and egress opening for permitting passage of a person between the fixed room and the auxiliary room, and means for closing the opening, whereby a portable warming room with the flexible heating walls is constructed within a fixed room of a building.

\* \* \* \* \*

UNITED STATES PATENT OFFICE
CERTIFICATE OF CORRECTION

PATENT NO. : 4,354,091
DATED : October 12, 1982
INVENTOR(S) : Claud N. Bain

It is certified that error appears in the above-identified patent and that said Letters Patent are hereby corrected as shown below:

Column 5, line 8, "not shows" should be --(not shown)--.

Signed and Sealed this

Twenty-first Day of December 1982

[SEAL]

Attest:

GERALD J. MOSSINGHOFF

Attesting Officer
Commissioner of Patents and Trademarks